3,147,580
CONTROLLING MEANS FOR A DOUBLE TWIST
WIRE MACHINE
Sidney B. Blaisdell, East Greenwich, R.I., and Alfred J. Ensor, Hayes, England; said Blaisdell assignor to The Edmands Company, a corporation of Rhode Island, and said Ensor assignor to Ensor (Patents) Ltd., a corporation of England
Filed Mar. 14, 1962, Ser. No. 179,546
2 Claims. (Cl. 57—58.7)

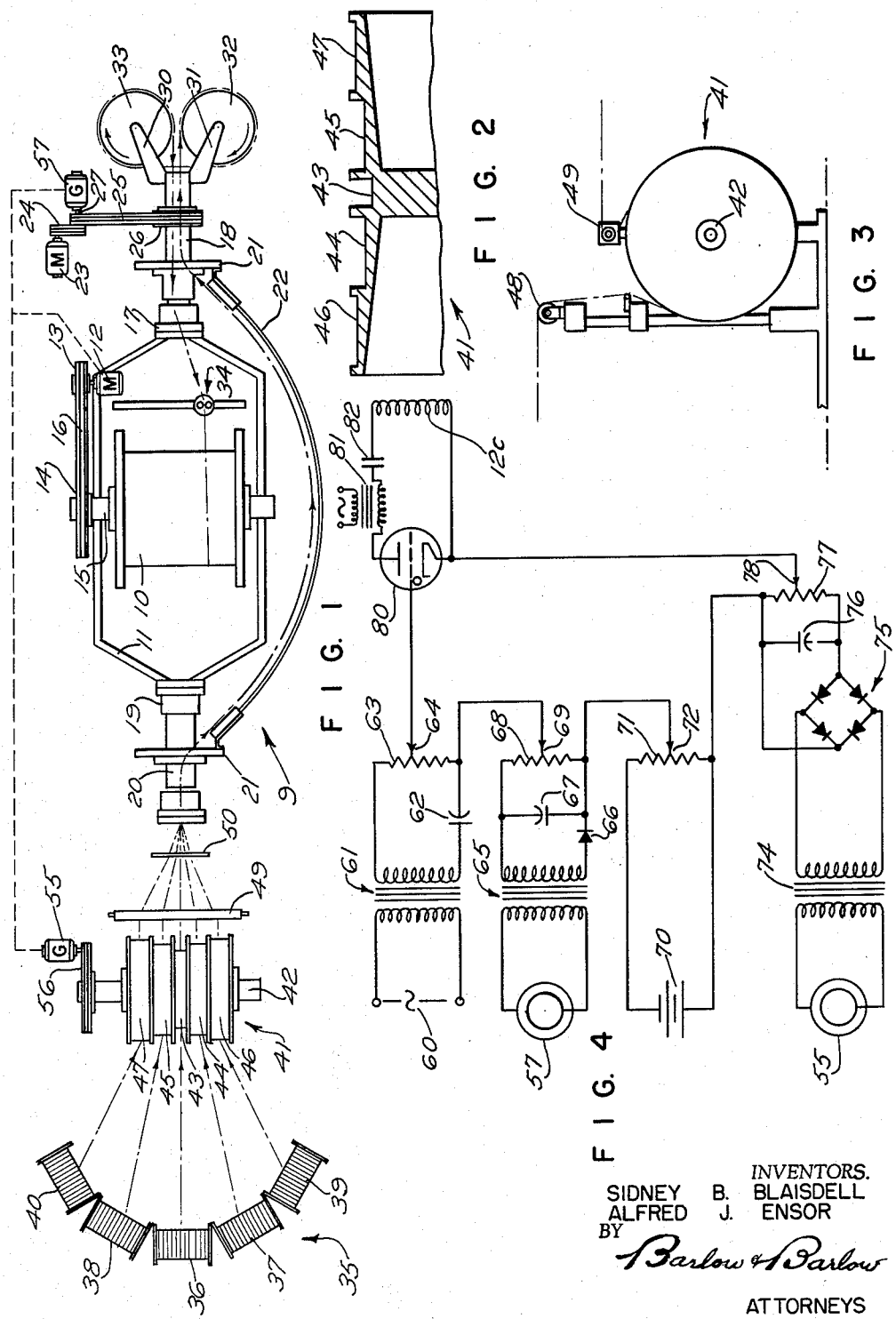

This invention relates to a double twist wire machine frequently referred to as a double twist closer and more particularly to the means for controlling the relation between the feeding of the supply wires and the take-up of the completed stranded wire.

In the operation of a double twist closer as the same are today supplied on the market, wires are drawn from the supply in such different lengths as may be necessary to make the first twist. When the second twist is made, the lengths of wires available for making the strand are not necessarily correct, and as a result distortion or looping out of individual wires or groups of wire may occur.

One of the objects of this invention is to use a metering capstan constructed in such a manner as to feed the precise length of wire required to make each layer of a concentric double twist strand and also to act as a means for controlling the speed of the take-up reel to produce a uniform twist.

Another object of this invention is to provide such relationship by electrical means which will eliminate the capstan change gears and slip mechanism heretofore incorporated in a wire closer.

With these and other objects in view, the invention consists of certain novel features of construction as will be more fully described and particularly pointed out in the appended claims.

In the accompanying drawings:

FIG. 1 is a schematic view showing a double twist closer for wire with which there is associated a multidiameter metering capstan and also generators responsive to both the speed of the capstan and the speed of the flyer with these two so related that they provide a differential relation to control the speed of the take-up motor;

FIG. 2 is a sectional view of the metering capstan or wheel showing a fragmental portion thereof and on a much larger scale than that shown in FIG. 1;

FIG. 3 is a side elevation of the metering capstan showing in dot-dash lines the wires which are led thereover and about a guide roll or bar; and FIG. 4 is a schematic electrical diagram showing the relationship between the generators and motors of the unit of the apparatus.

In proceeding with this invention, we have disposed a multidiameter metering wheel or capstan over which the supply wires to the double twist closer pass before entering the double twist closer, and we have equipped this capstan with a generator which will be driven by the capstan and also we have equipped the double twist closer with a generator which will be driven by the flyer or in time with the flyer motor and then so related these two generators that their differential will serve to control the speed of the take-up motor of the double twist mechanism so that the twisted cable will always have the same number of twists per unit of length as is desired. The metering wheel or capstan will have different diameters so as to feed the wires which require greater length in the cable than others at a faster rate, this being accomplished by the use of different diameters of the wheel so that the wires as they go into the cable will be of the correct theoretical length.

With reference to the drawings, 9 designates generally the double twist mechanism which comprises a take-up reel 10 mounted in a cradle 11. This reel 10 is driven by means of motor 12 through pulley 13 on the armature shaft of the motor, pulley 14 on the shaft 15 of the take-up reel, the two pulleys being connected by a belt 16 or a plurality of belts. The cradle 11 is supported at one end through sleeve 17 on shaft 18 while it is supported through sleeve 19 on shaft 20 at its opposite end. Shafts 18 and 20 are in axial alignment and rotate while the cradle 11 remains stationary or in a floating position upon the rotating shafts. Shafts 18 and 20 are provided with flanges 21 between which a bow 22 extends and serves to connect these shafts 18 and 20 so that they rotate together and swing the bow or bows if there is a balancing bow on the other side about the take-up reel which is mounted within it.

A motor 23 drives the shaft 18 through belts 24 and 25 and shaft 27; belt 25 drives pulley 26 on the shaft 18. A plurality of belts may be utilized for this purpose. The motor 23 serves as the master motor of the apparatus, whereas the motor 12 will be the follower motor and have its speed varied in accordance with the requirements of the apparatus.

Brackets 30 and 31 are attached to the shaft 18 to rotate with it and carry pulleys 32 and 33 about which the cable or stranded wire passes as it is formed and drawn through the machine to be assembled on the take-up reel 10.

The supply for the single wires to the closing machine is shown generally at 35 at the left of FIG. 1, and as shown, there is a wire from supply 36 which may serve as the center core of the assembled cable, while wires 37 and 38 will lead from these supplies 37 and 38 to be assembled about the wire 36 while wires from other supplies 39 and 40 will lead from these supplies to be assembled about a first layer of wires about the core 36. Each of these supplies 37, 38, 39 and 40 may represent several wires from each source.

The measuring capstan or wheel is show ngenerally at 41 and comprises a drum of a plurality of different diameters, there being a center diameter 43 over which the core passes with the diameters 44 and 45 at either side thereof over which the next layer of the plurality of wires pass, which are assembled about the core, and additional diameters 46 and 47 over which wires which provide the layer outside of the first layer are drawn. Thus as the wires are drawn into the machine over this capstan, the predetermined diameter of the portions of the wheel over which they are drawn serve to provide the correct length of wires to the closing machine. This drum or wheel rotates upon its axle 42, and as seen in FIG. 3, the wires are drawn over a guide bar or roll 48, thence about the wheel or drum 41 and over a guide bar or roll 49 in order that a substantial wrap about the wheel or drum may be provided and insuring a good frictional contact between the drum and the various supply wires as they are led into the machine.

After the wires are led about the measuring capstan or wheel and about the guide bar 49, they pass through a stationary perforated guide plate 50 or a series of such guide plates and thence into the tubular shaft 20 of the double twist mechanism. One twist is imparted in the wires immediately by the rotating shaft 20, and the wires as thus twisted are then led about the bow 22 through suitable guides and thence into tubular shaft 18 and out of this shaft, thence about the pulley 32, as shown by the arrows, across to the pulley 33 and thence back into the shaft 18 and out of this shaft to the guide 34 which is a traverse for laying the double twisted wire upon the take-up reel 10 in an orderly fashion.

It is necessary in order to get a perfect lay of the strands in the finished cable that there be a definite number of twists per unit of length of the wires as fed. The measuring capstan by reason of its different diameters which may be accurately provided will serve to provide the theoretically perfect length of wire supplied to the double twist mechanism and will be drawn into the double twist mechanism in accordance with the speed of the take-up motor 12 which drives the take-up reel. As the wire is laid on to the reel 10, its diameter is increasing. It is, however, necessary that the revolutions of the flyer be maintained in a certain definite ratio to the wires as fed, and one method by which this is accomplished is as follows, although other methods may be employed:

A generator marked G and designated 55 is driven by suitable pulleys and belt 56 from the shaft 42 of the measuring capstan. This generator will develop voltage proportional to the speed at which it rotates and thus may serve as a measuring device for measuring the unit lengths of wires which are fed into the double twist mechanism. Another generator 57 is connected to the drive shaft 27 which rotates in time with shaft 18 and consequently flyer 22, and it too will generate voltage proportional to its speed which gives a definite ratio of twists which are placed into the wire as fed through the shaft 18. These two generators are connected together in a differential relation and their resultant serves to control the eddy current clutch motor 12 so that its speed will maintain a constant ratio with reference to the speed of the flyer and shaft 18, thus causing the take-up reel to be driven for pulling wires into the machine in accordance with a set or predetermined ratio relative to the shafts or shaft which places twists into the wire. This is explained electrically by reference to the simplified diagrammatic showing of FIG. 4 which shows one of the basic circuits by which this result is obtained, there being others.

A source of alternating voltage is shown at 60 connected to the input of an isolation transformer 61 whose secondary is connected through a D.C. blocking capacitor 62 across a potentiometer 63 having a sliding contact as at 64. The output of generator 57 is also shown as being connected to another isolation transformer 65, the secondary of which is connected through a rectifying device 66 across a filter in the form of a capacitor 67 and a potentiometer 68 having a sliding arm 69. Additionally a source of direct current indicated as a battery 70 is connected across another potentiometer 71 having a sliding arm 72, and the output of the generator 55 is shown as connected through an isolation transformer 74 to a bridge rectifying network 75, the output of which is connected across a smoothing filter 76 in the form of a capacitor and a potentiometer 77 having a sliding arm 78. The potentiometers 63, 68, 71 and 77 are all serially connected between their wiper arms and one end thereof in the grid cathode circuit of a switching device 80 in the form of a thyratron. The thyratron 80 is connected in a usual fashion and is supplied with a source of alternating voltage through a transformer 81 and has in the plate cathode circuit a contactor 82 and a load device shown as the coil 12C of the eddy current motor 12. It will be noted that in this fashion the potentiometers will establish the firing potential to the thyratron. Further it will be noted that we effectively have reproduced across the potentiometers voltages as follows: A constant reference source across the potentiometer 71 which is used as a speed reference voltage and a constant A.C. voltage across the potentiometer 63, and across the potentiometer 68 is the rectified voltage of the tachometer generator 57 of the flyer drive which is connected in a fashion whereby an increase in the speed of the tachometer generator will effectively increase the grid voltage. Connected in opposition to this voltage is the rectified output of the tachometer generator of the measuring capstan which appears across the potentiometer 77. As the speed of the measuring capstan increases, the voltage appearing across the potentiometer 77 will effectively decrease the grid voltage. To understand how this affects the operation of the device, let us assume that the speed reference voltage which appears across the potentiometer 71 is set at a given level by moving the slider arm 72 to a certain point. At the same time the contactor 82 will be closed, placing across the plate cathode circuit of the thyratron a voltage and a circuitry not shown in the elemental diagram of FIG. 4. The flyer motor 23 is energized and as a result a voltage will begin to be generated by the generator 57 producing a voltage across the potentiometer 68. As mentioned before, the sliding arm 72 has been set at a point which should be high enough so that with the starting of the flyer motor 23 and the generation of a certain voltage by the tachometer generator 57, the thyratron 80 will fire and thus energize the core 12C of the eddy current motor. As a result of this the eddy current motor 12 will start and it keeps on increasing its speed until such time as the voltage of the tachometer generator 55 will decrease the grid voltage of the thyratron and hence decrease the voltage of the thyratron feed into the core of the eddy current motor. The ultimate result of this arrangement is that the speed of the takeup energized by the eddy current motor 12 will match in an appropriate way the voltages appearing across potentiometers 68 and 77 which are, respectively, the speed of the metering capstan and the lay setting or the speed of twist. In this fashion a variety of speeds of the wires over the metering capstan is maintained and the lay of the wire will remain constant.

We claim:
1. In an apparatus for forming stranded wire, a double twist mechanism including a take-up reel, a motor for driving the reel, a flyer for revolving about said reel, a master motor driving said flyer, a source of input strands, a multidiameter metering wheel, each strand passing over a different diameter of said wheel, speed responsive means connected to said wheel, second speed responsive means connected to said flyer, differential means, each of said speed responsive means being connected to said differential means, the output of said differential means controlling the speed of said take-up reel motor whereby a constant strand take-up speed is maintained relative to the master motor speed.

2. In an apparatus as in claim 1 wherein said first and second speed responsive means have an electrical output proportional to the rotative input thereto, said differential means consists of an electrical adder network to which the output of said first and second speed responsive means is connected and the output of said differential means includes a controlling element responsive to the output of the adder network, said controlling element being adapted to vary the speed of said take-up reel motor.

References Cited in the file of this patent
UNITED STATES PATENTS

| | | |
|---|---|---|
| Re. 18,142 | Angell | Aug. 4, 1931 |
| 2,171,993 | Reichelt | Sept. 5, 1939 |
| 2,342,767 | Stoltz | Feb. 29, 1944 |
| 2,985,994 | Menke et al. | May 30, 1961 |

FOREIGN PATENTS

| | | |
|---|---|---|
| 10,375 | Great Britain | of 1844 |